(12) United States Patent
Talanis et al.

(10) Patent No.: US 11,991,044 B2
(45) Date of Patent: May 21, 2024

(54) SYSTEM FOR DATA TRANSMISSION BETWEEN A CLIENT DEVICE, A SERVER DEVICE, AND A PLURALITY OF AUTOMATION DEVICES

(71) Applicant: Siemens Aktiengesellschaft, Munich (DE)

(72) Inventors: Thomas Talanis, Heroldsbach (DE); Harald Albrecht, Nuremberg (DE); Stephan Höme, Schwabach (DE); Frank Volkmann, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/787,462

(22) PCT Filed: Dec. 11, 2020

(86) PCT No.: PCT/EP2020/085665
§ 371 (c)(1),
(2) Date: Jun. 20, 2022

(87) PCT Pub. No.: WO2021/144086
PCT Pub. Date: Jul. 22, 2021

(65) Prior Publication Data
US 2023/0034951 A1 Feb. 2, 2023

(30) Foreign Application Priority Data
Jan. 17, 2020 (EP) .................................... 20152429

(51) Int. Cl.
*H04L 41/0869* (2022.01)
*G06N 20/00* (2019.01)
(Continued)

(52) U.S. Cl.
CPC ......... *H04L 41/0869* (2013.01); *G06N 20/00* (2019.01); *H04L 61/3015* (2013.01); *H04L 61/4511* (2022.05); *H04L 69/22* (2013.01)

(58) Field of Classification Search
CPC ............. H04L 41/0869; H04L 61/4511; H04L 61/5007; H04L 61/4552; H04L 69/22;
(Continued)

(56) References Cited

U.S. PATENT DOCUMENTS

| 2005/0198137 A1 | 9/2005 | Pavlik et al. |
| 2011/0010413 A1* | 1/2011 | Christenson ........ H04L 61/4511 709/203 |

(Continued)

FOREIGN PATENT DOCUMENTS

| EP | 3062490 A1 | 8/2016 |
| KR | 20110054370 A | 5/2011 |
| KR | 20150052538 A | 5/2015 |

OTHER PUBLICATIONS

PCT International Search Report and Written Opinion of International Searching Authority dated Apr. 7, 2021 corresponding to PCT International Application No. PCT/EP2020/085665, 15 pages.

*Primary Examiner* — Kyung H Shin
(74) *Attorney, Agent, or Firm* — Lempia Summerfield Katz LLC

(57) ABSTRACT

A system for data transmission between a client device, a server device and a plurality of automation devices, wherein the server device includes a descriptive representation of each of the plurality of automation devices, wherein the server device includes a server instance, which server instance is configured to load one of the descriptive representations based on a hostname identifying one of the plurality of automation devices, and wherein the server instance is configured to transmit data from the automation
(Continued)

device to a client application on the client device based on the loaded descriptive representation of the automation device.

12 Claims, 5 Drawing Sheets

(51) Int. Cl.
*H04L 61/3015* (2022.01)
*H04L 61/4511* (2022.01)
*H04L 69/22* (2022.01)

(58) Field of Classification Search
CPC ......... H04L 67/14; H04L 67/10; H04L 67/01; H04L 67/141; H04L 41/12; H04L 67/53; H04L 67/02; H04W 8/24; G06N 20/00; G06F 16/258; G06F 16/29
See application file for complete search history.

(56) References Cited

U.S. PATENT DOCUMENTS

| | | | |
|---|---|---|---|
| 2017/0134239 A1* | 5/2017 | Mahoney | ................ H04L 69/22 |
| 2019/0007365 A1* | 1/2019 | Dan | ....................... G06N 20/00 |
| 2019/0306699 A1* | 10/2019 | Shelton | ............... H04L 41/0869 |

\* cited by examiner

SYSTEM FOR DATA TRANSMISSION BETWEEN A CLIENT DEVICE, A SERVER DEVICE, AND A PLURALITY OF AUTOMATION DEVICES

The present patent document is a § 371 nationalization of PCT Application Serial No. PCT/EP2020/085665, filed Dec. 11, 2020, designating the United States, which is hereby incorporated by reference, and this patent document also claims the benefit of European Patent Application No. 20152429.5, filed Jan. 17, 2020.

TECHNICAL FIELD

The present disclosure relates to automation technology. Automation technology is a branch of engineering, which mainly relates to mechanical engineering and electrical engineering. It is used to automate technical processes in machines, plants or technical systems in general.

BACKGROUND

In addition to relieving people of dangerous, strenuous or routine activities, quality improvements, higher performance of the machine or plant, and reduction of personnel costs are the motivation to use automation techniques. Human activities may be reduced to the elimination of disturbances, material supply, prefabricated parts removal, maintenance, and similar work.

Automation systems, which are used in a variety of industries such as chemical, pharmaceutical, and wastewater treatment, oversee devices performing a process that creates or changes something by performing that process. For example, in oil refining, process control systems oversee the machinery and devices that transform crude oil into gasoline. A process control system may include three groups of electronic devices: controllers, input/output ("I/O") devices, and automation devices. Automation devices send information about process activities to controllers through the I/O system, and the controller in turn sends information to other field devices to make adjustments to process activities.

In addition, automation systems are involved in the physical and organizational structures and facilities used in the production of goods, such as products, procedures, a building or group of buildings, networks, controllers, interfaces, machinery, and assembly lines.

PROFINET, Ethernet IP, or Modbus-TCP are examples of Ethernet-based communication mechanisms. A communication mechanism may be defined by the associated protocol, (e.g., standardized), and the communication relationship on which it is based. Communication relationships organize communication between the devices participating in data transmission in the network, also known as users. Examples of communication relationships are client/server, master/slave, master/master, producer/consumer, or publisher/subscriber. TCP/IP is frequently used as the communication protocol for Ethernet-based networks. It is envisioned to replace the IP-based communication components through a pure Ethernet (Layer-2) communication. Omitting the IP stack would allow production of cheaper devices than previously possible for devices with IP stack.

SUMMARY

The scope of the present disclosure is defined solely by the appended claims and is not affected to any degree by the statements within this summary. The present embodiments may obviate one or more of the drawbacks or limitations in the related art.

Now, in the course of digitalization, customers need to access their automation devices remotely, for example from the cloud. However, because devices may no longer possess an IP stack, problems arise. Unlike previous devices, the automation devices without an IP stack are no longer accessible via IP-based and IP-routed networks. Hence, already existing as well as future Profinet and Open Platform Communications United Architecture (OPC UA) applications have to be expanded cost-intensively and time-consumingly by a Layer-2 communication, and in the meantime may be used on the local fieldbus only.

Therefore, a technical solution is required in which IP-less automation devices appear like automation devices that possess an IP stack.

It may be concealed to the user, (e.g., of a client application), whether the respective automation device possess an IP stack or not. Rather, the user, (e.g., via the client application), may be able to address all devices via IP. In particular, in the context of OPC UA the user may then communicate with (IP-less) automation devices via IP just as with other automation devices that possess an OPC UA server and IP-capabilities.

Protocols like "NAT", "ALG", as well as "Proxies" and "virtual hosts" have become known and allow interoperability between network protocols and application protocols. On the network level, the so-called "Network Address Translation" (NAT) serves as a common building block in a wide range of application scenarios. For example, NAT64 may be used to connect IPv6 clients to IPv4 devices, (cf. European patent application EP 3062490 A1), wherein an automatic and adaptive integration of IPv4 automation devices into IPv6 networks is described.

On the other hand, in case significantly different application protocols may have to be connected to each other using different (transport) communication layers, then so-called application layer gateways (ALG) may find a variety of use. Ultimately, a number of separate OPC-UA servers also serve as ALGs for accessing various automation devices and/or field buses.

Proxies, (and in particular web proxies), are, in addition to other tasks, used to provide client applications with a single application server and thus a single access point ("portal"), although there are actually several application servers behind the proxy, (cf. Section 2.3, "Intermediates" in RFC 7230, "Hypertext Transfer Protocol (HTTP/1.1): Message Syntax and Routing"). Similar to proxies, HTTP itself offers a function for dividing an application server into several logical application servers, in the form of the so-called "virtual hosts" (see RFC 7230, "Hypertext Transfer Protocol (HTTP/1.1): Message Syntax and Routing").

The present disclosure provides improvements and solutions to the situation described in the above.

According to a first aspect, a system for data transmission between a client device, a server device, and a plurality of automation devices is proposed. The server device includes a descriptive representation of each of the plurality of automation devices. The server device further includes a server instance configured to load one of the descriptive representations based on a hostname identifying an automation device of the plurality of automation devices. The server instance is configured to transmit data from the automation device to a client application on the client device based on the loaded descriptive representation of the automation device.

According to a second aspect, a server device according to the first aspect is proposed.

According to a third aspect, a client device according to the first aspect is proposed.

According to a fourth aspect, an automation device according to the first aspect is proposed.

According to a fifth aspect, a method for data transmission between a client device, a server device, and one or more automation devices is proposed, wherein the server device includes a server instance and a descriptive representation of each the plurality of automation devices. The method includes loading, by the server instance, one of the descriptive representations based on a hostname identifying an automation device of the plurality of automation devices. The method further includes transmitting, by the server instance, data from the automation device to a client application on the client device.

DETAILED DESCRIPTION

Figure 1:
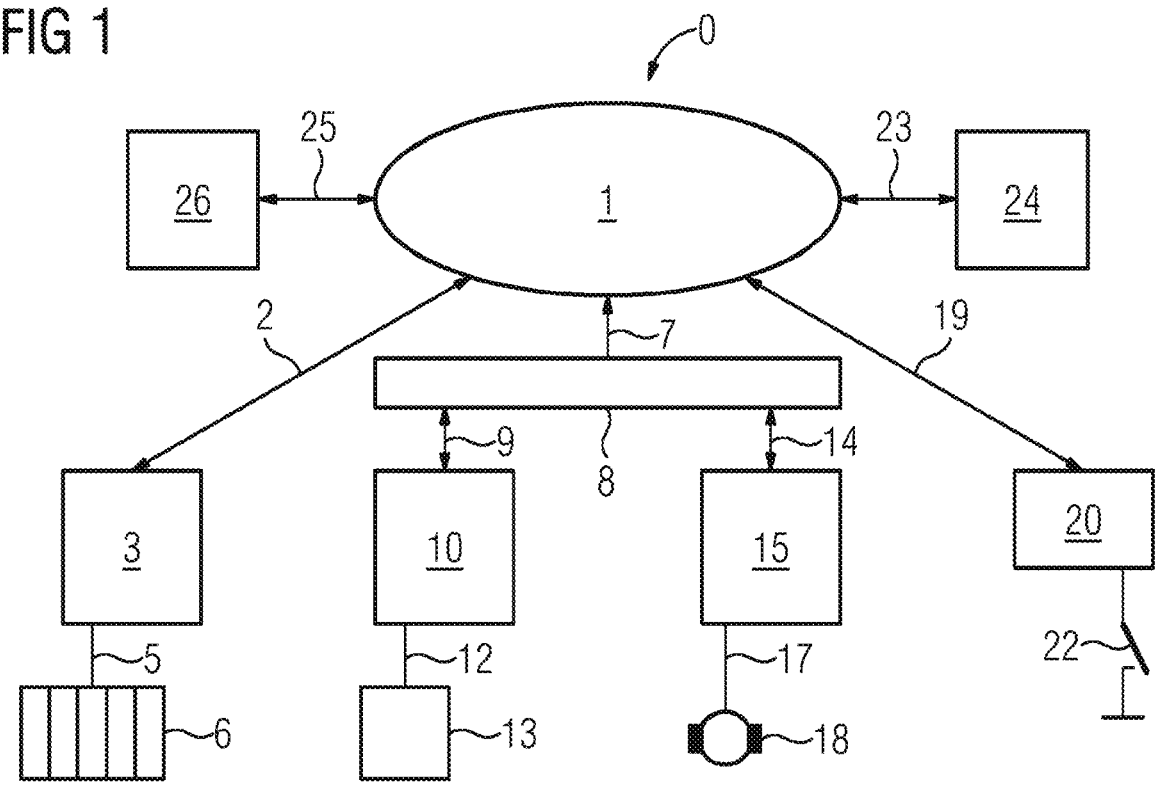
FIG. 1 shows an illustration of automation system including automation devices and servers.

FIG. 1 shows an automation system 0 including automation devices 6, 13, 17, 22 and different web servers 3, 10, 15, 20, 24 which are connected to one another directly or indirectly via the internet 1. Automation technology is a sub-area of plant engineering and engineering that mainly affects mechanical engineering and electrical engineering. Automation technology is used to automate technical processes in machines, plants, or technical systems in general. A first web server 3 communicates directly with the internet 1 via a connection 2. The first web server 3 is connected via a connection 5 to an input/output module 6 of an automation system. A second web server 10 and a third web server 15 are connected to the internet 1 via connections 9, 14, a firewall 8, and a connection 7. The second web server 10 has a connection 12 to a converter 13. The third web server 15 has a connection 17 with a drive 18. A fourth web server 20, referred to as an embedded web server, is connected directly to the internet 1 via a connection 19 and is embedded in a control of a valve 22. A fifth web server 24 shown in FIG. 1 possesses no automation functionality and communicates with the internet via a connection 23. A client 26, such as a web browser, is connected to the internet 1 via a connection 25. As shown, a web server may be communicatively coupled with an automation device. To this end, the web server may be embedded in the automation device.

A web server is a process running on a computer-or also distributed over a plurality of computers and may supply one or more clients (web browsers on different devices) with information. This information may either reside statically on the web server or else be generated dynamically by further utility routines. Communication partners connected via the internet 1 may therefore be web servers in the embodiment of the fifth web server 24 and client 26. The fifth web server 24 provides information, (e.g., internet pages), via the internet 1 in response to a request from a client 26. A web server may be connected via a connection and a TCP/IP stack. Further details regarding the use of web servers in the field of automation technology are, for example, disclosed in US patent application no. US 2005/0198137 A1.

Figure 2:
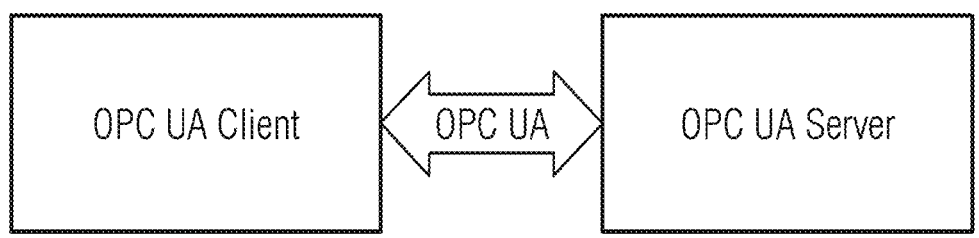
FIG. 2 shows an illustration of a client and a server.

FIG. 2 illustrates an arrangement for interaction between a client and a server. The client and the server may be collocated on a single device or may be located on separate devices. In an exemplary embodiment, an OPC UA client and an OPC UA server according to the OPC UA specification using a communication system, such as a network, are shown. In this case, the OPC UA client uses OPC UA service calls from a set of OPC UA service calls specified in the OPC UA protocol for interaction. The field of application for OPC UA clients and servers encompasses a wide range and their function may be implemented in different automation devices and automation systems, such as controllers, PC-based control systems, production management systems, or in production planning, for example.

Although, in the following, reference will be made to OPC UA clients and OPC UA servers and other specifics of the OPC UA protocol and/or OPC UA standard, this is for exemplary purposes only and the scope and spirit of the disclosure is not limited to OPC UA only but may apply to other protocols and standards as well.

OPC UA uses a similar client—server concept like classic OPC. An application that wants to expose its own information to other applications is called UA server and an application that wants to consume information from other applications is called UA client. But it is expected that much more applications will be both UA server and UA client in one application than in classic OPC. One reason is that more UA servers will be integrated directly in devices. Implementing also a UA client enables device to device communication. Another reason is the use of OPC UA as configuration interface, where UA clients are also UA servers to be configured via OPC UA.

A OPC UA application may be composed of three software layers shown in the following figure. The complete software stack may be implemented with C/C++, .NET, or JAVA. OPC UA is not limited to these programming languages and development platforms, but only these environments are currently used for implementing the OPC Foundation UA Stack deliverables.

The OPC-UA (web) server is used for the visualization, monitoring, and control of processes. By using the web technology, all variables of a process are available at any place and via any conventional web browser. The OPC-UA web server may be provided in the form of a library that is loaded and executed by a runtime environment. The OPC UA web server has an OPC UA client interface for accessing the variables of a process. The visualization may be created with the OPC-UA-Designer based on HTML5 and uploaded to the OPC-UA web server via an OPC-UA server interface.

An OPC UA application is a system that wants to expose or to consume data via OPC UA. It contains the specific functionality for the application and the mapping of this functionality to OPC UA by using an OPC UA Stack and an OPC UA Software Development Kit (SDK).

An OPC UA client or server SDK implements common OPC UA functionality that is part of the application layer, because the UA Stacks implement only the communication channels. An OPC UA SDK reduces the development effort and facilitates faster interoperability for an OPC UA application.

The Address Space Model in UA Part 3 specifies the building blocks to expose instance and type information and thus the OPC UA meta model used to describe and expose information models and to build an OPC UA server address space.

The abstract UA Services defined in UA Part 4 represent the possible interactions between UA client and UA server applications. The client uses the Services to find and access information provided by the server.

To cover all successful features known from classic OPC, information models for the domain of process information are defined by OPC UA on top of the base specifications. The so-called DA (Data Access) information model defines automation-data-specific extensions such as the modeling of analog or discrete data and how to expose quality of service. All other DA features are already covered by the base services. The Alarm & Conditions (AC) information model specifies an advanced model for process alarm management and condition monitoring. The Historical Access (HA) information model defines the mechanisms to access historical data and historical events. The Programs (Prog) information model specifies a mechanism to start, manipulate, and monitor the execution of programs.

The base information model specified in UA Part 5 provides the framework for all information models using OPC UA. It defines the following: the entry points into the address space used by clients to navigate through the instances and types of an OPC UA server; the base types building the root for the different type hierarchies; the built-in but extensible types like object types and data types; the Server Object providing capability and diagnostic information; and the abstract UA Services defined in UA Part 4 represent the possible interactions between UA client and UA server applications. The client uses the Services to find and access information provided by the server. The Services are abstract because they are defining the information to be exchanged between UA applications but not the concrete representation on the wire and also not the concrete representation in an API used by the applications.

To connect to a server, a client needs information like network address, protocol, and security settings. For this purpose, OPC UA defines a set of discovery features.

All information which is required to establish a connection between client and server is stored in a so-called endpoint. A server may provide several endpoints, each containing: Endpoint URL (protocol and network address); Security Policy (name for a set of security algorithms and key length); Message Security Mode (security level for exchanged messages); and User Token Type (types of user authentication supported by the server).

If several OPC UA servers exist, a Discovery Server may be used to provide information of available servers. Servers may register at the Discovery Server. Clients may then request a list of all available servers from the discovery server and then use the GetEndpoints service to get connection information from a server.

One of the biggest challenges of OPC UA for embedded devices is the memory consumption of the huge server address space. Already the standard OPC UA namespace with namespace index 0 contains 1755 nodes, and over 4000 strings with over 80K of pure string data. The SDK allows multiple instances of our address space implementation. For every namespace you create a new address space, which together form the complete server address space. The same web service may have multiple endpoints, for example in order to make it available using different protocols.

The TCP/IP stack is a set of networking protocols. The OSI Model was meant to be a standardized way of connecting devices together, and most protocols have some direct correlation to the OSI Model. The OSI Model has 7 layers, the TCP/IP stack which is the most common Protocol suite in use today has 4. The Internet Protocol layer in the TCP/IP protocol stack is the first layer that introduces the virtual network abstraction that is the basic principle of the Internet model.

Today, the OPC UA standard provides a host communication parameter that is transmitted by OPC UA clients and which, according to the text of the OPC UA standards ("OPC UA Part 4 Services"), is used to provide that a client signals the host name and thus which server network interface the client addresses when communicating with an OPC UA Server. A PLC may have multiple IP network interfaces, but individual network interfaces may only be reached from certain subnets, so that users have detailed network topological knowledge in order to have successfully address OPC UA Server. For example, when listing the OPC Server Transport endpoints deployed on a host with the so-called GetEndpoints service, the addressed host name is included as part of the so-called endpointUrl parameter, which a client uses in its request to the GetEndpoints service. Due to the lack of network continuity the service uses the host name to filter its response, so that only those endpointUrls are transmitted to the client that it may actually reach.

Furthermore, the host communication parameter is used when setting up a OPC UA server session using the CreateSession service. In that case the client re-enters the server endpoint it actually addresses in the form of an endpointUrl parameter.

Figure 3:
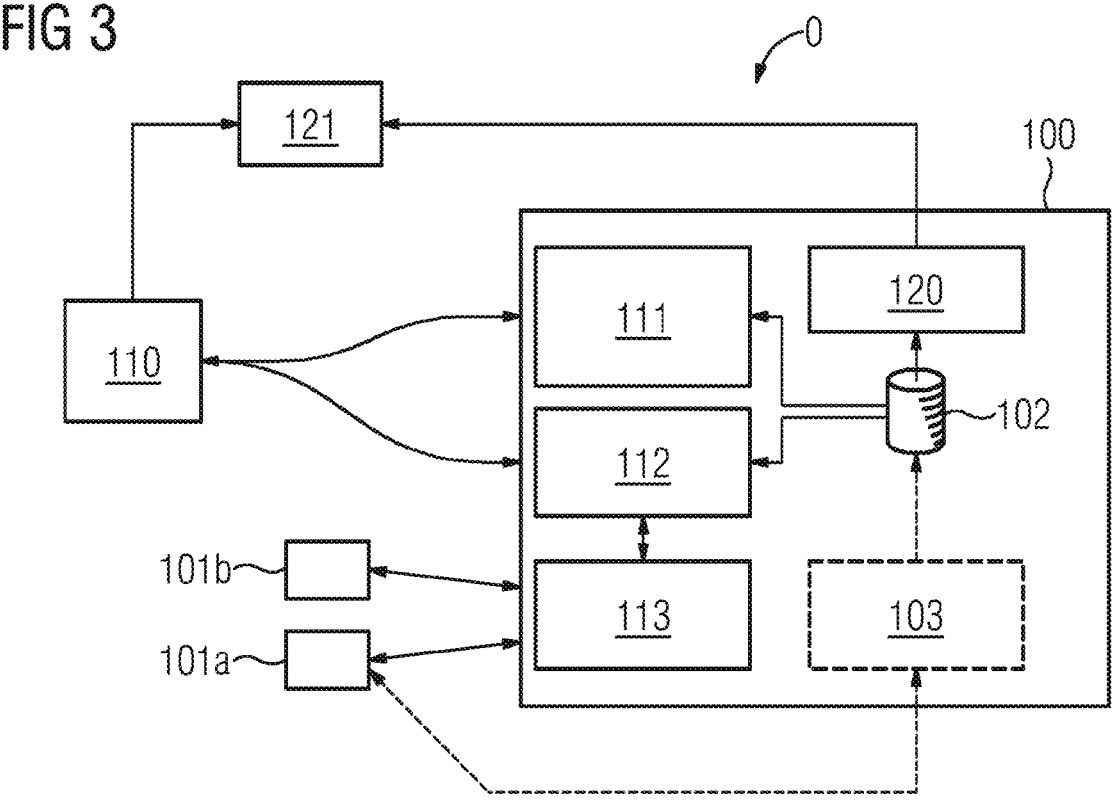
FIG. 3 shows an illustration of an automation system including a client device, a server device and automation devices.

Now turning to FIG. 3, an automation system 0 is shown. The automation system 0 including a client device 110, a server device 100, and multiple automation devices 101a, 101b. Again, reference to the OPC UA standard is made for exemplary purposes and one or more other standards for an operating an automation system 0 may be used.

According to an embodiment, an OPC UA client 110 interoperates with an OPC UA server 112, (e.g., wherein the server 112 is located on a server device such as a PLC 100), as if this server appears to be on each individual automation device 101a and 101b, respectively. The device-specific information models, cf. 123a, 123b in FIG. 4, of the individual automation devices 101a, 101b appear as if the respective OPC UA server is located directly on the respective automation device 101a, and 101b itself. In particular, for each automation device, the client 110 sees a (apparently) separate OPC UA server. Hence, it appears as if each automation device 101a, 101b has its own OPC UA server 112. This means that multiple information models, in particular, the individual device information models, cf. 123a, 123b in FIG. 4, of the respective automation devices 101a, 101b are available. However, only the information model of one automation device 101a, 101b at a time is made available by the server 112, e.g., by loading one information model at a time and/or one information model after the other. Hence, an OPC UA client 110 does not see an OPC UA server in which all device information models have been aggregated, (e.g., simultaneously), but rather multiple individual OPC UA servers 112 appear to be present, each of which provides exactly one device information model 123a or 123b. This eliminates the need for the OPC UA client 110 to know whether it is using information in the automation device 101a, 101b itself, or in the "virtual" OPC UA server 112, e.g., located on the PLC 100. There is no mixing of the information models of different automation devices, as is the case today, for example, in so-called "aggregating" OPC UA servers. Ultimately, the current, e.g., PLC-based, OPC UA server are aggregated servers because they provide information about multiple automation devices to an OPC UA client via a single OPC UA server. In that case, it is no longer transparent for users and thus for, e.g., one or more client-side, OPC UA applications, from where the information, which was requested, is actually retrieved. Additionally, in the event of a change in the automation system, e.g., the replacement or addition of an automation device, a data point's URL is subject to a corresponding change, and the change in the datapoints or device's URL is followed up.

To solve this problem, a registration module such as a Domain Name System (DNS) registration module 120, may be provided on a server device, such as PLC 100. The DNS registration module 120 may receive, (e.g., from a local data base 102), the hostnames of automation devices 101a, 101b for which a respective OPC UA Server 112 needs to be instantiated. The DNS registration module 120, which may also take the form of a DNS client, then may register the devices' 101a, 101b hostnames in a (automation system-specific) DNS server 121, (e.g., via DNS UPDATE), for example, according to RFC 2136. The assignment and/or registration of an automation device's hostname may include that the hostname is associated with the server device, e.g., the PLC 100. Optionally, the devices' 101a, 101b hostnames may also be dynamically assigned by a scanner 103, e.g., based on DHCP, and may then be stored in the local data base 102.

An OPC UA Client 110 then may use an OPC URL, which contains the DNS name of the OPC UA server 112. According to the OPC UA protocol, a client application, (e.g., on client device 110), first uses the endpoint service 111 to determine the available server endpoints. At the same time, the client application also transmits the hostname of the automation device 101a, 101b addressed. Now, the endpoint service 111 may not only compare the hostname received with the hostname assigned to the server device 100, (e.g., the PLC 100), but also with the list of hostnames assigned to automation devices 101a, 101b in local data base 102. The automation devices' hostnames are not assigned to the server device 100, (e.g., the PLC), but are "virtual" OPC UA servers assigned to the automation devices 101a, 101b.

Figure 4:
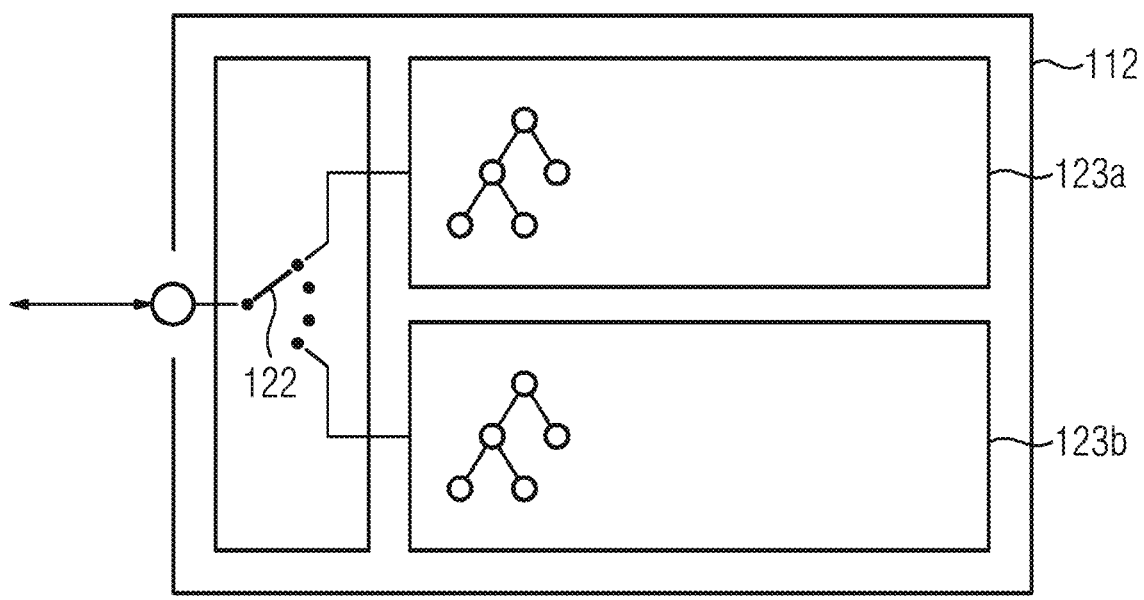
FIG. 4 shows an illustration of an illustration of a server capable of loading a descriptive representation of an automation device.

As shown in more detail in FIG. 4, according to the OPC UA protocol, the client 110 selects one of the appropriate server endpoints and uses it to set up an OPC UA session to the OPC UA server 112. The session initiation is illustrated by the double arrow in FIG. 4. The hostname transmitted during session setup is evaluated by the OPC UA server 122, and only the information model 123a, 123b is loaded in this session which corresponds to the automation device 101a, 101b with the respective hostname received.

Hence, a DNS registration module 120 is proposed, which allows the IP-less automation devices 101a, 101b to be registered in a Domain Name System (DNS) and assigns an IP address of an OPC UA Server to the IP-less IO devices 101a, 101b. Hence, in the embodiment of FIG. 3, the client device 110 and the server device 100 are communicatively coupled via a network-layer protocol, and the server device 100 and the automation devices 101a, 101b are communicatively coupled via a data-link-layer protocol.

Thus, a single OPC UA server, may serve as a multiplicity of (virtual) OPC UA servers with the same IP address, but different hostnames, e.g., different DNS Fully-Qualified Host Names (FQHN). Based on the hostname of an automation device specified, (e.g., in the session setup), only the corresponding information model may be seen in this session and is accessible via the server's instance. This means that there are, so to speak, several virtual OPC UA servers present in a server device, such as a PLC 100, at the same time.

It is a benefit, that, in the event of a device exchange, (e.g., between a device with an IP stack and a device without an IP stack), the exchange may become invisible to OPC-UA applications due to the fact that the neither the automation device's hostname, (e.g., the FQDN), nor the device's OPC UA data model is changed. This is achieved by adding the hostname of the automation device to the DNS server.

In particular, it is avoided that existing OPC UA URLs are changed. A change of the IP address is hidden by way of the architecture proposed, which includes the self-registration and automatically update of the server device 112 and in particular the local data base 102. Another benefit is that a rapid and automatic maintenance of the automation devices' FQDNs with the associated OPC UA server IP address is enabled. Yet another benefit is that no additional load for direct communication of (Cloud) applications with the automation devices is caused, e.g., via a fieldbus. Rather a process image 113 on the server device 112, (e.g., the PLC 100), may be used as shown in FIG. 3.

At least with regard to OPC-UA, IP-less automation devices 101a, 101b may now be communicatively coupled to a client 110 in the same way analogous to IP-capable automation devices are coupled to clients 110.

Furthermore, only a single IP address, (e.g., the IP address of the server device 112), is necessary to communicate with multiple automation devices 101a, 101b. Thereby, a user is relieved from the administration of multiple IP addresses.

Figure 5:
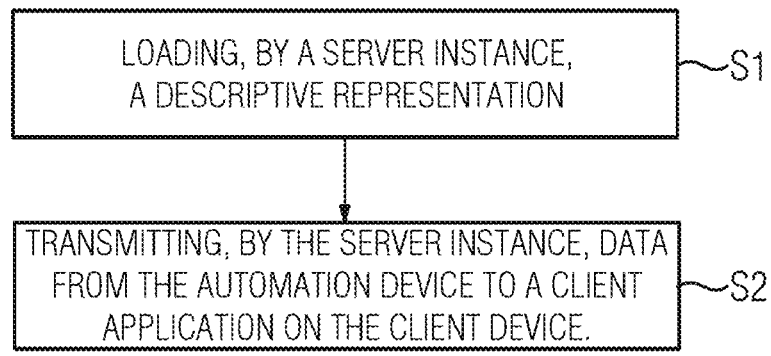
FIG. 5 shows method acts of a first embodiment.

Now turning to FIG. 5, exemplary method acts of an embodiment of a server are shown. In act S1, a server or a server instance may load a descriptive representation of an automation device. The descriptive representation of an automation device may correspond to the information model according to the OPC UA standard. However, other descriptive representations, such as an EDDL according to an IEC standard IEC 61804, of an automation device are possible. The server instance may be an instance of a web server or more particularly of an OPC UA web server. In certain examples, only one descriptive representation of the automation device at a time may be loaded by the server or server instance. However, a plurality of descriptive representations may be available for loading, wherein each descriptive representation is associated with a corresponding automation device.

In act S2, the server or server instance may transmit data from the automation device to a client application on a client device. The information of an automation device may then be made available to the client application using the descriptive representation and corresponding data may be transmitted from the server instance to the client application. By way of the descriptive representation of the automation device, the specific static and dynamic behavior of the automation device becomes available to the client application.

Figure 6:
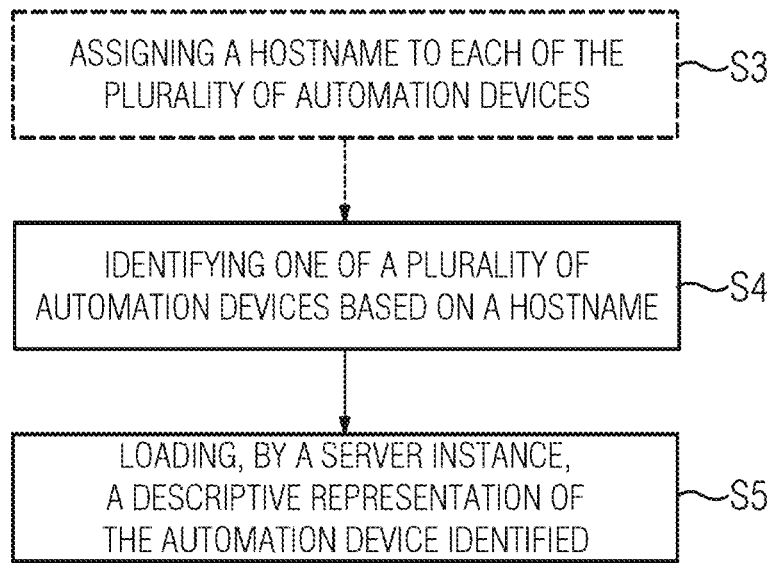
FIG. 6 shows method acts of a second embodiment.

Now turning to FIG. 6, further exemplary method acts of an embodiment are shown. In act S3, a hostname may be assigned to each of the plurality of automation devices. This may be done manually or automatically as described in connection with FIGS. 3 and 4 and the hostnames may be stored in a local device list.

In act S4, (e.g., a single) one out of a plurality of automation devices are identified based on a hostname of the automation device. The particular hostname of an automation device may be received from a client application on a client device.

In act S5, a server instance may then load a descriptive representation of the automation device identified. The descriptive representation loaded may correspond to the automation device identified. That is to say, a specific descriptive representation is loaded based on a hostname of an automation device.

Figure 7:
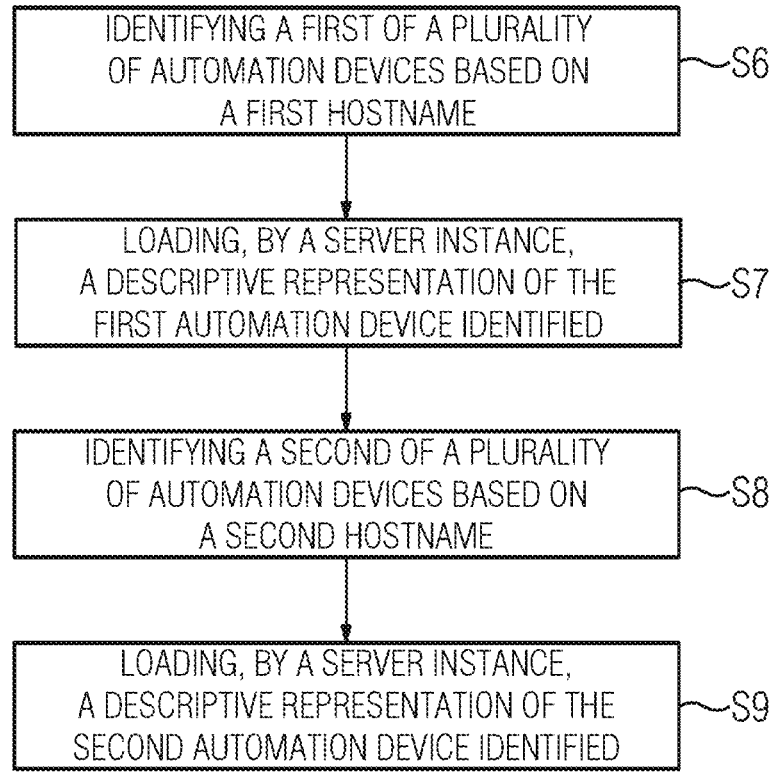
FIG. 7 shows method acts of a third embodiment.

Now, turning to FIG. 7, further exemplary method acts of an embodiment are shown. In act S7, a first automation device from a plurality of automation devices is identified based on a first hostname. In act S8, a descriptive representation of the first automation device identified is loaded by the server instance. Then, for example, if a second hostname is received by the server instance, a second automation device out of the plurality of automation devices is identified based on the second hostname. In act S9, a descriptive representation of the second automation device identified is loaded by the server instance. After receiving the second hostname, the server instance may be deleted completely and a new instance may be created based on the second descriptive representation of the second automation device identified, or the server instance may be modified in order to reflect the second descriptive representation loaded by the server instance. In any case, after loading the second descriptive representation of the second automation device, the server instance on the server device is capable of providing information relating to the second automation device only.

Figure 8:
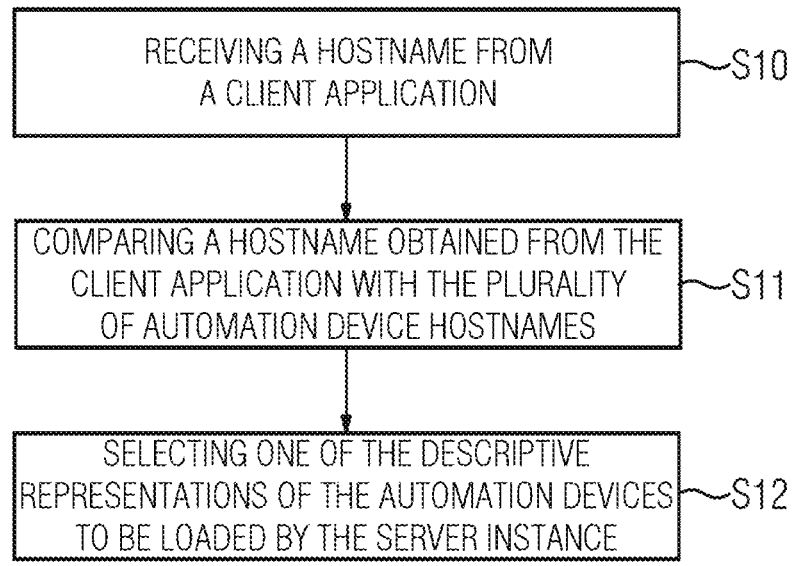
FIG. 8 shows method acts of a fourth embodiment.

Now, turning to FIG. 8, further exemplary method acts of an embodiment are shown. In act S10, a server device may by way of a server instance receive a hostname from a client application on a client device. In act S11, the server instance compares a hostname obtained from the client application with a plurality of automation device hostnames, e.g., in order to identify a descriptive representation of an automation device. In act S12, the server instance may select (a single) one of the descriptive representations of the automation devices to be loaded by the server instance. The method acts described herein may be performed by the server instance and/or other (software) modules on the server device interacting with the server instance to provide the functionality. For example, the server instance may interact with the DNS registration module in order to obtain the descriptive representation of an automation device, in particular the OPC UA information model. In the same way, the server instance and/or the DNS registration module may interact with the endpoint service and/or the client application on the client device.

Figure 9:
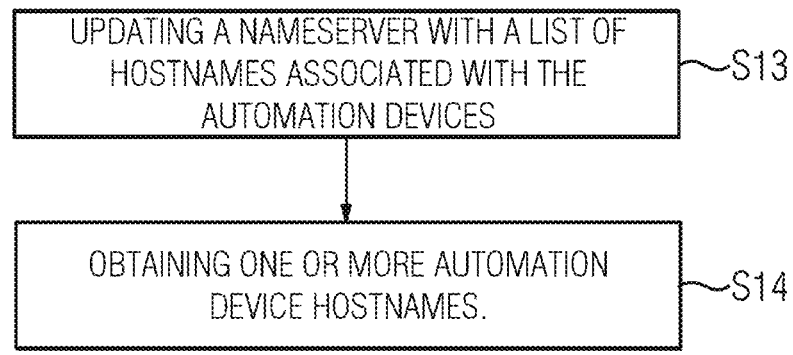
FIG. 9 shows method acts of a sixth embodiment.

Now, turning to FIG. 9, further exemplary method acts of an embodiment are shown. In act S13, a nameserver may be updated with a list of hostnames associated with the automation devices. The list of hostnames may be gathered the scanner identified by reference sign 103 in FIG. 3. Periodic and/or event driven scans of one or more network, e.g., fieldbuses, connected to the server device may be performed by the scanner, e.g., in order to identify newly installed or exchanged automation devices. In act S14, one or more automation device hostnames may be obtained by a DNS server, (e.g., the DNS server of FIG. 3), in order to update the hostnames of automation devices available in the automation system. A client device may then, as also shown in FIG. 3, retrieve, (e.g., by querying the DNS server), the updated list of hostnames and may make use of one or more of the hostnames in order to retrieve data from an automation device as the case may be. The DNS client and/or the DNS server may be part of a name service which serves assigning hostnames to automation devices and/or storing the hostnames and/or making the hostnames available to the client application and/or server instance.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for data transmission between a client device, a server device, and one or more automation devices of a plurality of automation devices, the system comprising:
   a memory;
   the client device;
   the plurality of automation devices; and
   the server device, wherein the server device comprises:
      a descriptive representation of each automation device of the plurality of automation devices;
      a server instance configured to load one descriptive representation of the descriptive representations based on a hostname identifying one automation device of the plurality of automation devices;
      a name service; and
      an endpoint service,
   wherein the hostname identifying the one automation device is configured to be selected by the client device,
   wherein the server instance is configured to transmit data from the identified automation device to a client application on the client device based on the loaded descriptive representation of the identified automation device,
   wherein the server instance is configured to load, among a plurality of descriptive representations available for loading, only one descriptive representation of one automation device at a time,
   wherein each descriptive representation of the plurality of descriptive representations available for loading is associated with a corresponding automation device among the plurality of automation devices,
   wherein the client application of the client device is configured to obtain one or more automation device hostnames from the name service,
   wherein the endpoint service of the server device is configured to compare the one or more automation device hostnames obtained from the client application with a hostname assigned to the server device and with a list of the automation device hostnames stored in a local database, and
   wherein the one or more automation device hostnames are not assigned to the server device.

2. The system of claim 1, wherein the server instance is configured to load a first descriptive representation of a first automation device of the plurality of automation devices based on a first hostname identifying the first automation device,
  wherein the server instance is configured to load a second descriptive representation of a second automation device of the plurality of automation devices based on a second hostname identifying the second automation device,
  wherein the first description representation and the second description representation are loaded one at a time.

3. The system of claim 1, wherein the server instance is an Open Platform Communications/United Architecture (OPC/UA) server instance, the client application is an OPC/UA client application, the descriptive representation is an OPC/UA information model, or a combination thereof.

4. The system of claim 1, wherein the client device and the server device are communicatively coupled via a network-layer protocol, and
  wherein the server device and the plurality of automation devices are communicatively coupled via a data-link-layer protocol.

5. The system of claim 4, wherein the network-layer protocol is an Internet Protocol and the client application is configured to use the Internet Protocol to request automation device data from the server instance.

6. The system of claim 4, wherein, at least on one part of a communication path between the server instance and the plurality of automation devices, only the data-link-layer protocol and a physical layer protocol are used.

7. The system of claim 1, wherein each automation device of the plurality of automation devices possesses a communication stack,
  wherein the communication stack comprises a physical protocol layer and a data-link protocol layer.

8. The system of claim 1, wherein the server device comprises a programmable logic controller configured to control, monitor, or both control and monitor one or more automation devices of the plurality of automation devices.

9. The system of claim 1, wherein the name service is configured to assign a hostname to each automation device of the plurality of automation devices, and/or
  wherein the client application uses one of the respective automation device hostnames in order to obtain automation device data from a respective automation device via the server instance, and/or
  wherein the endpoint service is further configured to select one of the descriptive representations of the plurality of automation devices to be loaded by the server instance based on a hostname received from the client application, and/or
  wherein the server device is configured to update the name service with the list of the automation device hostnames associated with the corresponding automation devices of the plurality of automation devices.

10. A system for data transmission between a client device, a server device, and one or more automation devices of a plurality of automation devices, the system comprising:
  a memory;
  the client device;
  the plurality of automation devices; and
  the server device, wherein the server device comprises:
    a descriptive representation of each automation device of the plurality of automation devices;
    a server instance configured to load one descriptive representation of the descriptive representations based on a hostname identifying one automation device of the plurality of automation devices;
    a name service configured to assign a hostname to each automation device of the plurality of automation devices; and
    an endpoint service,
    wherein the server instance is configured to transmit data from the identified automation device to a client application on the client device based on the loaded descriptive representation of the identified automation device,
    wherein the server instance is configured to load, among a plurality of descriptive representations available for loading, only one descriptive representation of one automation device at a time,
    wherein each descriptive representation of the plurality of descriptive representations available for loading is associated with a corresponding automation device among the plurality of automation devices,
    wherein the client application is configured to obtain one or more automation device hostnames identifying one or more automation devices of the plurality of automation devices from the name service,
    wherein the endpoint service is configured to compare the one or more automation device hostnames obtained from the client application with a hostname assigned to the server device and with a list of the automation device hostnames stored in a local database, and
    wherein the one or more automation device hostnames are not assigned to the server device.

11. The system of claim 10, wherein the client application is further configured to establish a session with the server instance based on the one or more automation device hostnames selected by the client application.

12. A system for data transmission between a client device, a server device, and one or more automation devices of a plurality of automation devices, the system comprising:
  a memory;
  the client device;
  the plurality of automation devices; and
  the server device, wherein the server device comprises:
    a descriptive representation of each automation device of the plurality of automation devices;
    a server instance configured to load one descriptive representation of the descriptive representations based on a hostname identifying one automation device of the plurality of automation devices;
    a name service;
    an endpoint service; and
    a scanner,
    wherein the hostname identifying the one automation device is configured to be selected by the client device,
    wherein the server instance is configured to transmit data from the identified automation device to a client application on the client device based on the loaded descriptive representation of the identified automation device,
    wherein the client device is configured to obtain one or more automation device hostnames from the name service,
    wherein the scanner is configured to identify newly installed or exchanged automation devices and update the name service with a list of hostnames associated with the newly installed or exchanged automation devices,
    wherein the endpoint service is configured to compare the one or more automation device hostnames obtained from the client application with a hostname assigned to the server device and with a list of the automation device hostnames stored in a local database, and wherein the one or more automation device hostnames are not assigned to the server device.

* * * * *